United States Patent
Sriram et al.

(10) Patent No.: US 8,458,782 B2
(45) Date of Patent: Jun. 4, 2013

(54) AUTHENTICATED SESSION REPLICATION

(75) Inventors: Tv Sriram, Bangalore (IN);
Aswinikumar Kondapalli, Bangalore (IN)

(73) Assignee: Novell, Inc., Provo, UT (US)

( * ) Notice: Subject to any disclaimer, the term of this patent is extended or adjusted under 35 U.S.C. 154(b) by 981 days.

(21) Appl. No.: 11/975,107

(22) Filed: Oct. 17, 2007

(65) Prior Publication Data

US 2008/0250490 A1 Oct. 9, 2008

(30) Foreign Application Priority Data

Apr. 4, 2007 (IN) .............................. 754/DEL/2007

(51) Int. Cl.
*G06F 9/00* (2006.01)

(52) U.S. Cl.
USPC ........................................................... 726/12

(58) Field of Classification Search
USPC ........................................................... 726/12
See application file for complete search history.

(56) References Cited

U.S. PATENT DOCUMENTS

| 5,235,642 A | 8/1993 | Wobber et al. |
| 5,856,974 A * | 1/1999 | Gervais et al. ................. 370/392 |
| 5,870,386 A * | 2/1999 | Perlman et al. ................ 370/256 |
| 5,913,025 A | 6/1999 | Higley et al. |
| 6,445,691 B2 | 9/2002 | Sato |
| 6,510,154 B1 * | 1/2003 | Mayes et al. ................... 370/389 |
| 6,954,790 B2 | 10/2005 | Forslow |
| 2001/0005883 A1 * | 6/2001 | Wray et al. .................... 713/151 |
| 2002/0032865 A1 * | 3/2002 | Golubchik et al. ............ 713/178 |

* cited by examiner

*Primary Examiner* — Cordelia Zecher
(74) *Attorney, Agent, or Firm* — Schwegman, Lundberg & Woessner, P.A.

(57) ABSTRACT

Apparatus, systems, and methods may operate to receive, at an authentication agent in a first local area network (LAN), a virtual proxy authentication identification from a virtual proxy serving as a single point of trust for a second LAN across a wide area network. The virtual proxy authentication identification may be included in a modified session message originated within the second LAN. As a result, the apparatus, systems, and methods can operate to transmit content associated with the modified session message to a first plurality of individual proxy modules in the first LAN. Additional apparatus, systems, and methods are disclosed.

29 Claims, 4 Drawing Sheets

AUTHENTICATED SESSION REPLICATION

RELATED APPLICATIONS

The present application claims priority to India Patent Application No. 754/DEL/2007 filed in the India Patent Office on Apr. 4, 2007 and entitled "AUTHENTICATED SESSION REPLICATION;" the disclosure of which is incorporated by reference herein.

FIELD

The embodiments disclosed herein relate generally to data processing, including network session authentication and replication.

BACKGROUND

Data is collected, organized, and processed for virtually every transaction and communication that occurs in today's global economy. The integrity of this information (e.g., the authenticity and/or security of a message) has become important to enterprises and individuals. Consequently, a variety of techniques for securing and replicating information processing sessions exists in the industry, such as when sessions are distributed across a wide area network (WAN).

Session distribution may include exchanging messages between participating members in a cluster, such as session creation, session destruction, session timeouts, and session ownership changes. Session distribution may include session replication, in turn, via broadcasting replicated session messages. However, as the number of servers and/or services in the cluster increase, the message traffic due to replication operations can also increase, sometimes exponentially.

This is because, in a cluster push model, every new session is replicated to every server in the cluster, across all WANs and LANs, since a session request can go to any of the members in the cluster. That is, authenticated sessions are replicated across the servers in the cluster, so that if a switch fails-over a user session from one proxy service on the server to another, there is no need to re-authenticate.

For example, when a proxy service sends messages from one LAN to another LAN across a WAN, the result can be a large number of session replication message transmissions across the WAN, the number dramatically increasing with the number of proxy servers. The latency of authentication session replication also increases with the number of proxy servers. It is the potential for such increases in message traffic and latency that generate a need for improved session replication techniques.

SUMMARY

In various embodiments, apparatus, systems, and methods for session replication are provided. For example, in some embodiments, authenticated session replication includes receiving, at an authentication agent in a first LAN, a virtual proxy authentication identification from a virtual proxy serving as a single point of trust for a second LAN across a WAN. The virtual proxy authentication identification may be included in a modified version of a session message originated in the second LAN.

Some embodiments further include transmitting content associated with the modified session message only to a first plurality of individual proxy modules in the first LAN. Other embodiments are also described, and along with the foregoing example, will be set forth in detail below.

DETAILED DESCRIPTION

Figure 1:
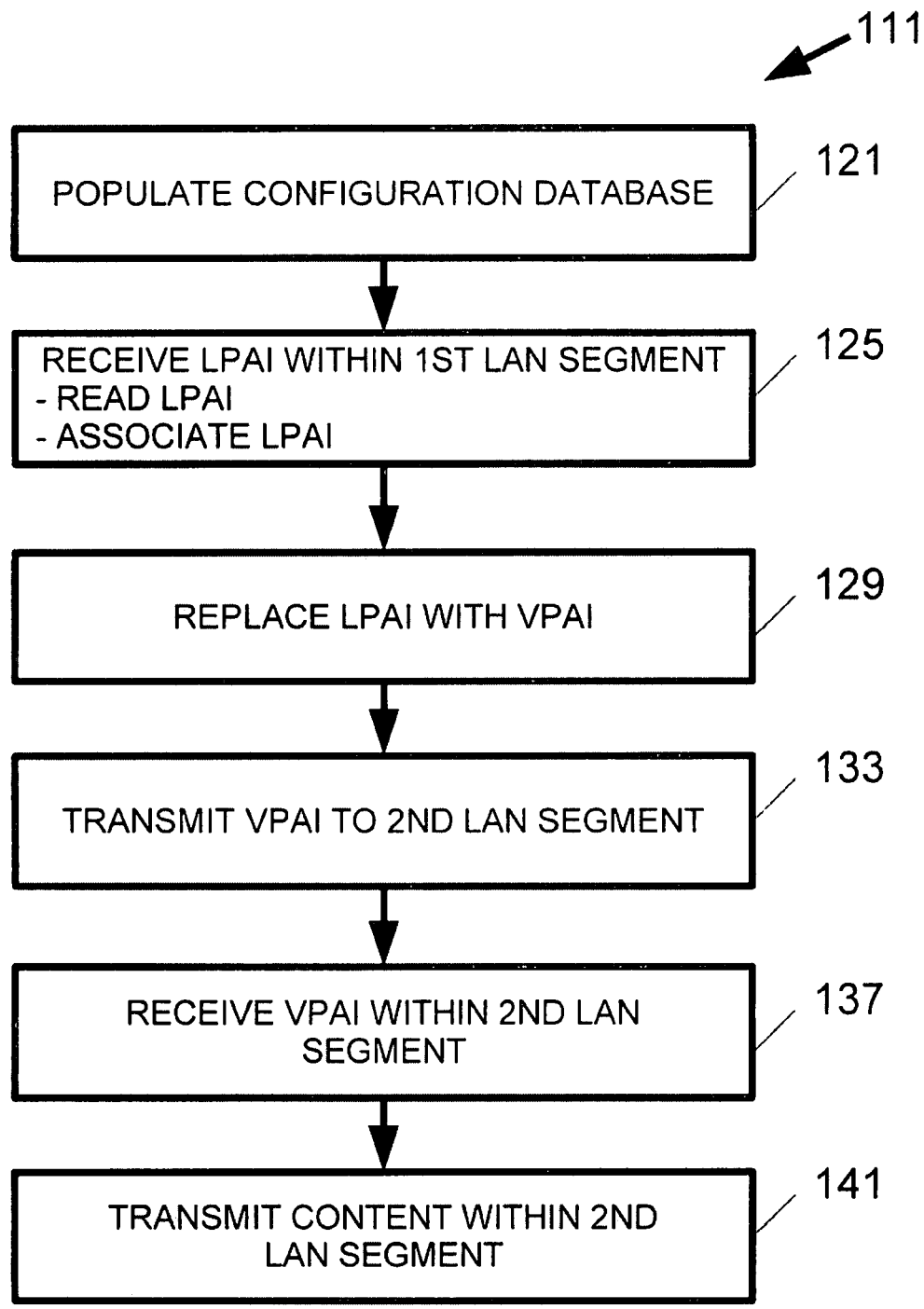
FIG. 1 is a flow diagram illustrating authenticated session replication methods according various embodiments of the invention.

Some of the challenges described above may be addressed by using representative LAN virtual agents to implement authenticated session replication for clusters spanning a WAN and a plurality of LANs. LAN virtual agents, unique to each WAN endpoint, may be incorporated to represent sessions originating from their associated LAN within a cluster. By assigning a unique identification to each virtual agent, which in turn owns all sessions originating within its associated LAN, the overhead associated with trust establishment can be reduced. Thus, a cluster of servers can span a WAN to implement authenticated session replication without dramatically increasing WAN link utilization and session replication latency.

In many embodiments that make use of virtual agents, a unique authentication agent and virtual proxy are assigned to every LAN segment in the cluster. Thus, to the authentication agent in a particular LAN segment, only one virtual proxy is visible in every other LAN segment. Thus, even if a particular LAN segment has "N" individual proxies, authentication agents looking to communicate with that segment will see only a single virtual proxy. Any new session created within a LAN segment by any individual proxy in that segment will therefore be seen as a session created by the unique virtual proxy that represents that segment.

As a concrete example, if each of 50 LAN segments are connected by a WAN, with 20 servers in each LAN segment, a single session might be replicated on roughly 1000 servers across the WAN using prior schemes (that do not implement the LAN virtual agents as described herein), such that trust between the various entities will be established approximately 1000 times. However, if virtual agents are used in the manner described, each authentication agent may operate to replicate the session for only 49 servers across the WAN, and 20 servers within its own LAN segment. This reduction of approximately fifteen times applies to both the number of replicated sessions, as well as to the number of trusted entities.

As used herein, an "authentication agent" comprises an authenticated session repository and a broker that broadcasts proxy session messages from an originating individual proxy within its own LAN segment to all other participating virtual proxies in a cluster, as well as to the other individual proxies within its own (the same) LAN segment. However, the authentication agent does not transmit such messages to the virtual proxy within the same LAN segment.

A "cluster" comprises a set of proxy servers fronted by a layer four (L4) switch. Layer four represents the fourth, or transport, layer of the Open Systems Interconnection (OSI) network communication model.

A "proxy" (e.g., an individual proxy) operates to authenticate a user that is not yet in the session and to pass the authentication information to the authentication agent, which distributes the information to all of the virtual proxies (except the virtual proxy within its own LAN segment) in the cluster, as well as to individual proxies within its own LAN segment.

A "virtual proxy" or virtual agent comprises a representative proxy of all the proxies in a selected LAN segment belonging to the cluster. In generic terms, the virtual proxy operates as an agent, as that term is known to those of ordinary skill in the art.

A "LAN segment" comprises a set of individual proxies, an authentication agent, and a virtual proxy agent that are coupled to a single LAN, typically with high bandwidth connectivity among the component elements.

"Session replication messages" or session messages comprise session creation messages, session destruction messages, session timeout messages, and session ownership messages. A "session creation message" is created for a new session by a proxy after authenticating a user. This message is propagated to authentication agents. A "session destruction message" indicates session destruction due to a logout event, created by the proxy to which the user logs out. This message is propagated to authentication agents for a global logout. A "session timeout message" indicates the proxy that created the session has timed out the session, and this message is propagated to authentication agents in the cluster. A "session ownership change message" indicates that a session is now in use in another proxy. The originating proxy has timed out and all proxies need to change their records of session ownership to indicate the proxy where the session is currently in use.

When a trusted entity operates as a "single point of trust," this means that the trusted entity functions as a secure authentication mechanism, so as to securely authenticate one group of entities (e.g., individual proxies within a LAN), and then to serve as a single source that represents the fact of their authentication to a second group of entities (e.g., a group of virtual proxies).

Various embodiments of the invention can be implemented in existing network architectures, directory services, security systems, storage interfaces, operating systems, file systems, backup systems, replication systems, and/or communication devices. For example, in some embodiments, the techniques presented herein are implemented in whole or in part using Novell® network services, proxy server products, email products, operating system products, and/or directory services products distributed by Novell, Inc., of Provo, Utah.

Embodiments of the invention can therefore be implemented in a variety of architectural platforms, operating and server systems, devices, systems, or applications. Any particular architectural layout or implementation presented herein is thus provided for purposes of illustration and comprehension only, and is not intended to limit the various embodiments.

FIG. 1 is a flow diagram illustrating authenticated session replication methods 111 according various embodiments of the invention. The methods 111 are implemented in a machine-accessible and readable medium. The session replication methods 111 are operational over processes within and among networks. The networks may be wired, wireless, or a combination of wired and wireless. The methods 111 may be implemented as instructions, which when accessed by a machine, perform the processing depicted in FIG. 1. Given this context, authenticated session replication is now discussed with reference to FIG. 1.

To set up a foundation that can be used to establish a circle of trust according to various embodiments, an authenticated session replication method 111 may begin at block 121 with populating a configuration database with information regarding a trust relationship between a virtual proxy, a plurality of individual proxy modules, and an authentication agent within a LAN or LAN segment.

Here, a unique identification is assigned to every virtual proxy associated with a WAN endpoint. In this manner, the configuration database is populated with information so that each individual proxy module within a LAN or LAN segment knows the authentication agent that it will connect to and trust, each authentication agent understands the individual proxy modules (within its own LAN or LAN segment) and the virtual proxies that it trusts, and the virtual proxies know all the authentication agents that they will connect to and trust. The plurality of individual proxy modules, the LAN or LAN segment authentication agent, and the virtual proxies can thus read the configuration database, when they are launched, to establish trust among themselves.

In this way, the authentication agent in a LAN segment can establish a circle of trust with all the participating virtual proxies, so that every session associated with an authenticated user in the cluster can be trusted by the authentication agent. Thus, when a session creation message is received by an authentication agent from a virtual proxy from another LAN or LAN segment across a WAN, the source of the message (an individual proxy) will be trusted by the authentication agent, even though there is no direct trust relationship between the authentication agent and the individual proxy that created the session.

In some embodiments, authentication agents will be able to access an associated list of approved internet protocol (IP) addresses and ports in the configuration database. The members of this list may be selected by a system administrator. If a virtual proxy thereafter connects to an approved IP address and port then it will be trusted. A similar process occurs with the virtual proxies and their trusted authentication agents. In this manner, the virtual proxies can access information as to the IP address and port that should be used to connect to a particular authentication agent. Thus, session messages received at an authentication agent from a virtual proxy connected to an approved IP address and port will be trusted.

All sessions are uniquely identified by the individual proxy that authenticates them. A proxy that creates an authenticated session has the rights to destroy it. Thus, the method 111 may include receiving a local proxy authentication identification (LPAI) associated with one of a first plurality of individual proxy modules within a first LAN or LAN segment at block 125.

Receiving the LPAI at block 125 may include reading the LPAI from the configuration database and associating the LPAI with a session message created by one of the first plurality of individual proxy modules within a LAN or LAN segment.

Each created session is thereby associated with information, perhaps comprising a record that has a fixed format. The record may include the type of the message, the identification of the originating proxy for the message (e.g., the LPAI), and then the message itself (which has its own format as well). The virtual proxy can then replace the identification of the originating proxy in the record with its own identification when transmitting the message to authentication agents outside the LAN or LAN segment.

Thus, the method 111 may continue with replacing the LPAI with a virtual proxy authentication identification (VPAI) associated with the unique virtual proxy within the first LAN or LAN segment at block 129. The virtual proxy can thereby serve as single point of trust across a WAN for session messages emanating from the first plurality of individual proxy modules.

Thus, any session message or record received from any of the individual proxy modules can have the LPAI replaced with the VPAI to provide a modified session message before transmission to authentication agents across the WAN using the approved IP address and port. Any modified session message received from any of the virtual proxies at an authentication agent in a particular LAN or LAN segment is then sent only to the individual proxy modules in the LAN or LAN segment (when received via an approved IP address and port), and not propagated to other virtual proxy agents. In this manner, any authentication agent receiving a message has established trust with the virtual proxy that sends it, so as to accept the message ownership and replicate the message content. A direct trust relationship between the authentication agent and the individual creating proxies in other LANs is not needed.

Therefore, when a session message passes from a LAN Segment through its virtual proxy to other LAN Segments across a WAN, the virtual proxy can modify the originator identification (of the individual proxy that created the session) to the unique identification of the virtual proxy. In this way, establishing trust between each authentication agent, the plurality of individual proxies in its associated LAN segment, and the virtual proxies across WAN segments is sufficient to accomplish authenticated session replication within the cluster. The transformation of the authentication identification (from that of the creating individual proxy to that of the virtual proxy) within a LAN segment relieves components in other LAN Segments from needing specific knowledge of the existence of individual proxies in every segment.

The method 111 may go on to include transmitting the VPAI (usually, but not necessarily, as part of a session message) across the WAN to an authentication agent in a second LAN or LAN segment at block 133. The VPAI is also transmitted to the other authentication agents representing other LANs in the cluster. The method 111 may thus continue with receiving, at an authentication agent in the second LAN or LAN segment, the VPAI in a modified one of the session messages from the virtual proxy across the WAN at block 137. The method 111 may conclude with transmitting content associated with the modified session message only to a second plurality of individual proxy modules in the second LAN or LAN segment at block 141.

Figure 2:
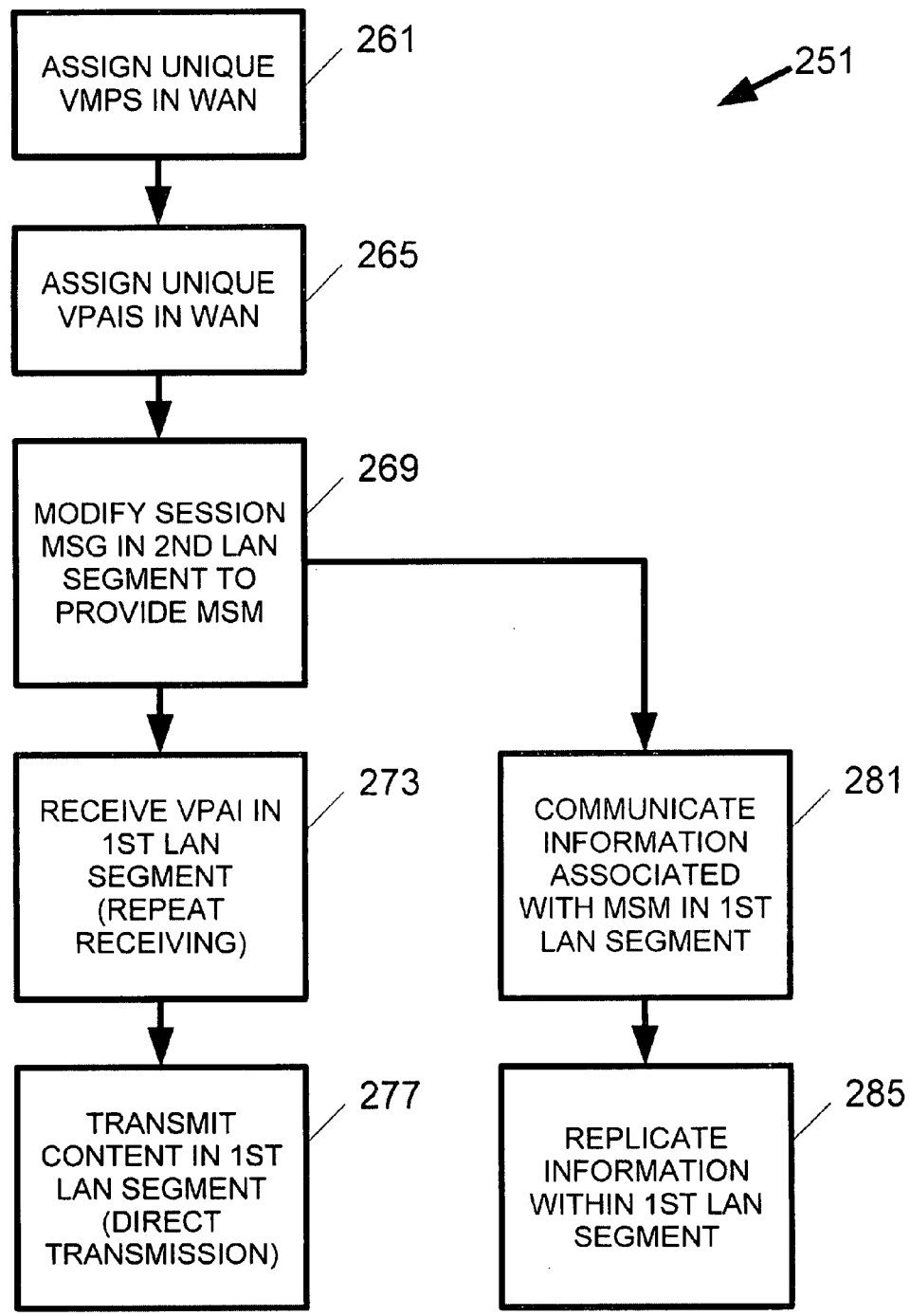
FIG. 2 is another flow diagram illustrating authenticated session replication methods according various embodiments of the invention.

FIG. 2 is another flow diagram illustrating authenticated session replication methods 251 according various embodiments of the invention. In this case, authenticated session replication is described more specifically with respect to propagating modified messages among virtual proxies and authentication agents. The methods 251 are implemented in a machine-accessible and readable medium. The session replication methods 251 are operational over processes within and among networks. The networks may be wired, wireless, or a combination of wired and wireless. The methods 251 may be implemented as instructions, which when accessed by a machine, perform the processing depicted in FIG. 2.

At block 261, the method 251 may include assigning unique virtual proxies to connection endpoints (e.g., LAN segments) of a WAN. The method 251 may continue with assigning a VPAI to each virtual proxy as a unique identity across the WAN at block 265.

Uniqueness may be established when the connection endpoints comprise transmission control protocol (TCP) endpoints, such that combinations of IP addresses and TCP ports for the connection endpoints are used to establish trust between peers. This mechanism has been described above. However, the various embodiments are not to be so limited. For example, uniqueness may also be established when the connection endpoints comprise secure socket layer (SSL) endpoints, and server certificates and/or client certificates are used to establish trust between peers.

The method 251 may go on to include, at block 269, modifying a session message from one of a second plurality of individual proxy modules in a second LAN or LAN segment according to the VPAI associated with the virtual proxy in that LAN or LAN segment to provide a modified session message. Once the session message has been modified, the method 251 may include receiving, at an authentication agent in a first LAN or LAN segment, the VPAI from the virtual proxy serving as a single point of trust for the second LAN or LAN segment across a WAN at block 273. The virtual proxy will also send the VPAI and modified session message to the other authentication agents representing other LANs in the cluster. The method 251 may also include repeating the receiving to replicate sessions created in the second LAN or LAN segment and authenticated by its virtual proxy.

The method 251 may include transmitting content associated with the VPAI and the modified session message (originated within the second LAN or LAN segment) only to a first plurality of individual proxy modules in the first LAN or LAN segment at block 277. The method 251 may also include transmitting the content directly from the authentication agent to the first plurality of individual proxy modules.

In some embodiments, the method 251 may include, at block 281, communicating information regarding a session associated with the modified session message from the virtual proxy to the authentication agent. The method 251 may also include, at block 285, replicating the information within the first LAN or LAN segment using the first plurality of individual proxy modules trusted by the authentication agent.

Figure 3:
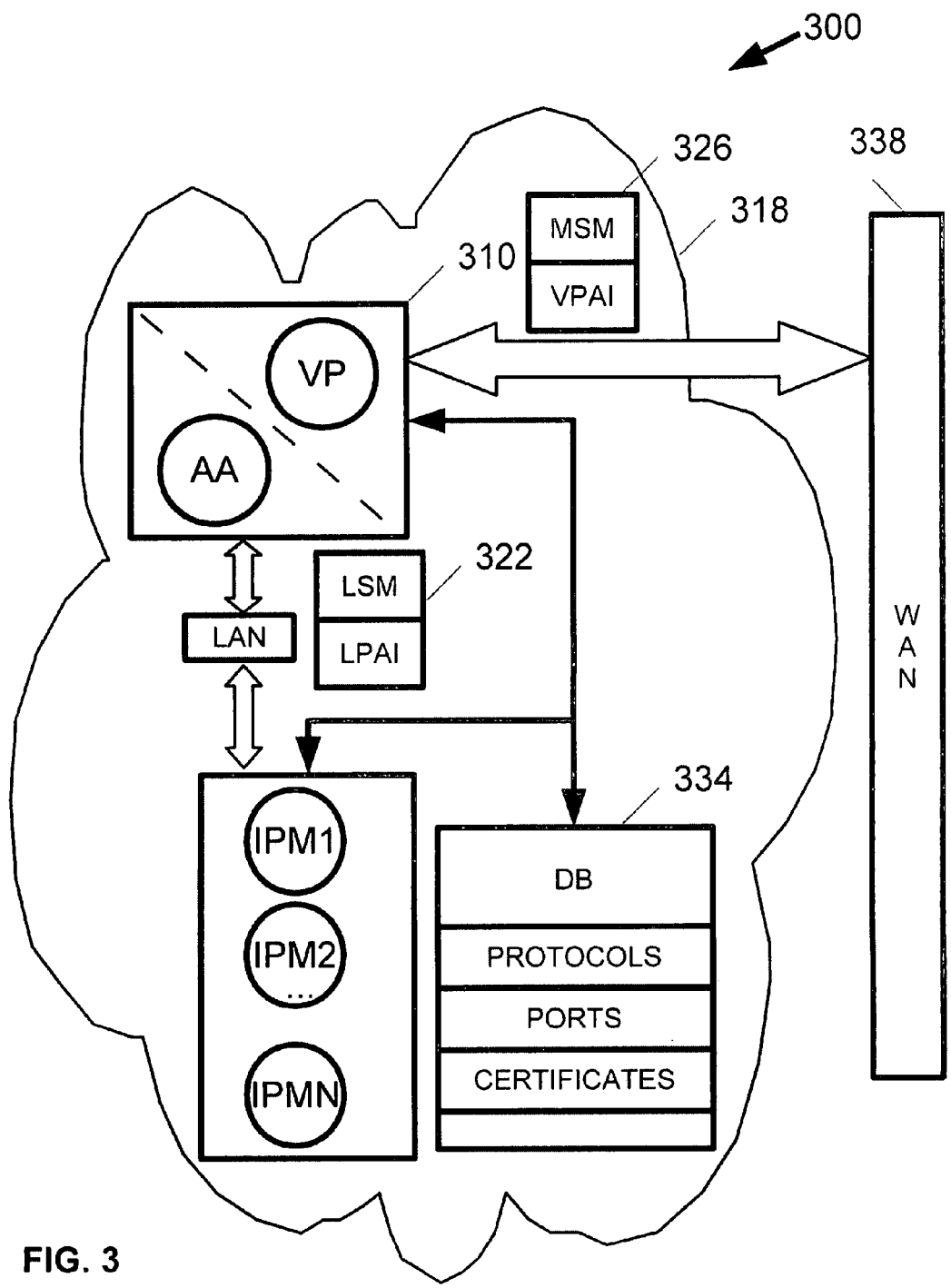
FIG. 3 is a block diagram of an authenticated session replication apparatus according various embodiments of the invention.

FIG. 3 is a block diagram of an authenticated session replication apparatus 300 according various embodiments of the invention. The authenticated session replication apparatus 300 is implemented in a machine-accessible and readable medium and is operational over one or more networks (e.g., the LAN 318 and the WAN 338). The networks may be wired, wireless, or a combination of wired and wireless. The authenticated session replication apparatus 300 implements, among other things, the processing associated with the authenticated session replication methods 111 and 251 of FIGS. 1 and 2, respectively.

Turning now to FIG. 3, it can be seen that in some embodiments the authenticated session replication apparatus 300 comprises a virtual proxy VP within a LAN 318, and an authentication agent AA within the LAN 318. The virtual proxy VP and/or the authentication agent AA may be implemented in one or more machine accessible media to process on one or more machines within the LAN. The authentication agent AA, in turn, is to couple to a plurality of individual proxy modules IPM1, IPM2, . . . , IPMN within the LAN 318. That is, the authentication agent AA processes within the LAN and communicates with the individual proxy modules IPM1, IPM2, . . . , IPMN within the LAN 318. The virtual proxy VP is to represent all of the plurality of individual proxy modules IPM1, IPM2, . . . , IPMN as a single point of trust across the WAN 338 to authentication agents (not shown in FIG. 3, but see element AA2 in FIG. 4) outside the LAN segment 318.

The apparatus 300 may comprise an execution element 310, such as a switch (e.g., an L4 switch), a server, a terminal, a personal computer, a workstation, or any combination of these, coupled together within a LAN 318. Modules may comprise hardware, software, and firmware, or any combination of these.

The execution element 310 may comprise a single entity, or several entities in communication with one another, such as one or more Novell® BorderManager® (NBM) proxy servers, Novell® Access Manager™ Linux® Access Gateways, or any intermediary that checks for and accomplishes authentication in a cluster spanning links across a WAN. Thus, in some cases, the virtual proxy VP and the authentication agent AA may be included in a single server.

In some embodiments, the virtual proxy VP is to modify a local session message (LSM) 322 received from any one of the plurality of individual proxy modules IPM1, IPM2, . . . , IPMN according to a VPAI associated with the virtual proxy VP to provide a modified session message (MSM) 326. Thus, as described above, the virtual proxy VP may operate to replace an LPAI associated with the LSM 322 with a VPAI associated with the virtual proxy VP. It should be noted, however, that the modification of the LPAI to provide a VPAI may or may not include direct replacement (e.g., encoding or encrypting via bit manipulation, such as shifting and other numeric operations, may be used), depending on the design of a particular apparatus 300.

In some embodiments, the apparatus 300 may comprise a memory 334 (e.g., a database DB) to store a configuration, including protocols and ports associated with the plurality of individual proxy modules IPM1, IPM2, . . . , IPMN and their respective LPAIs. The configuration, as described above, enables the authentication agent AA to communicate with a selected one of the other virtual proxies (not shown, but see element VP2 in FIG. 4) in any selected LAN or LAN segment across the WAN 338. The plurality of individual proxy modules IPM1, IPM2, . . . , IPMN also have access to the memory 334.

Figure 4:
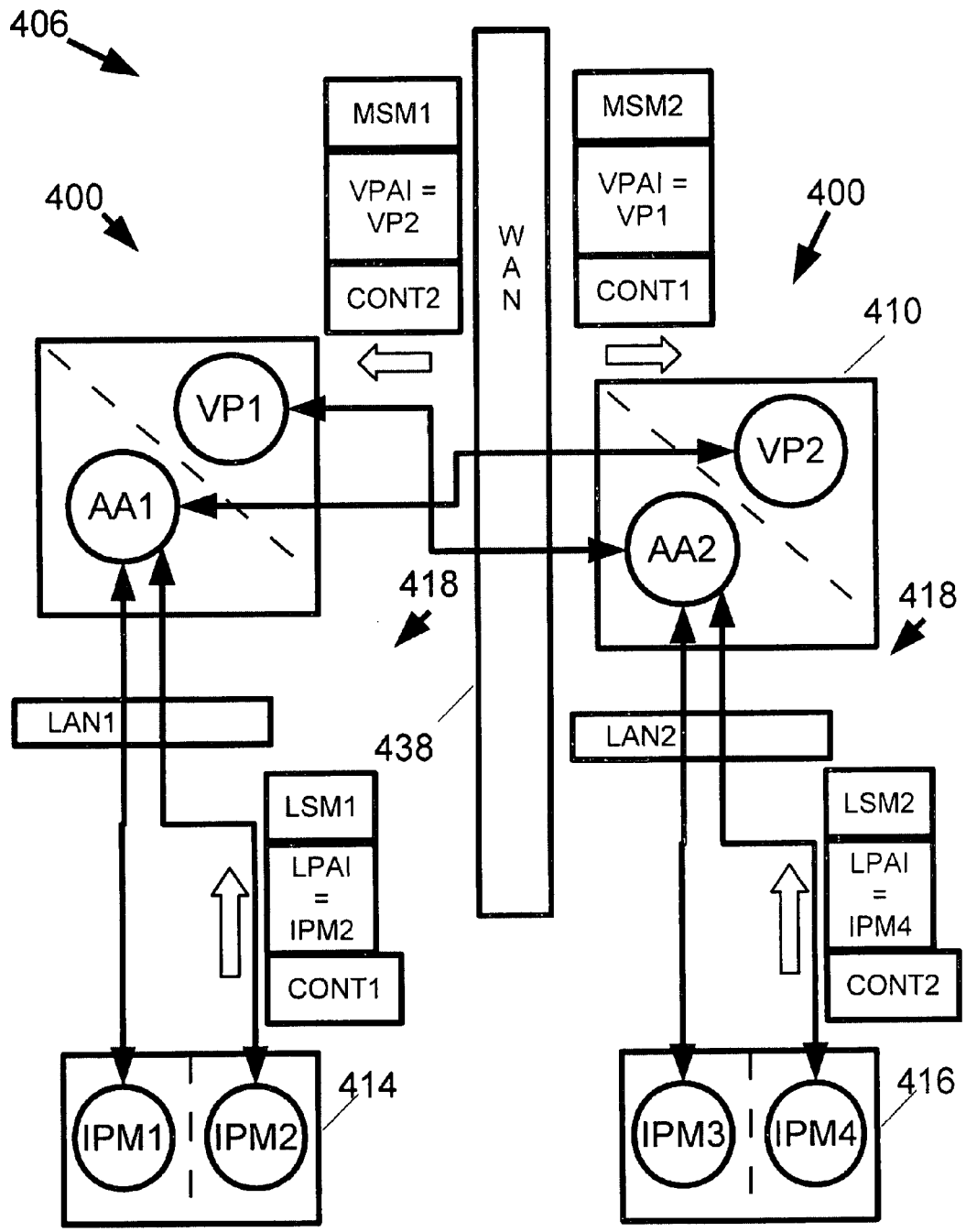
FIG. 4 is a block diagram of an authenticated session replication system according various embodiments of the invention.

FIG. 4 is a block diagram of an authenticated session replication system 406 according various embodiments of the invention. The authenticated session replication system 406 is implemented in a machine-accessible and readable medium and is operational over one or more networks (e.g., LANs 418 and WAN 438). The networks may be wired, wireless, or a combination of wired and wireless. The authenticated session replication system 406 includes multiple instances of the apparatus 400 (similar to or identical to the apparatus 300 shown in FIG. 3), and implements, among other things, the processing associated with the authenticated session replication methods 111 and 251 of FIGS. 1 and 2, respectively.

Turning now to FIG. 4, it can be seen that an authenticated session replication system 406 may comprise a first plurality of individual proxy modules 414 within a first LAN or LAN segment, as well as a first authentication agent AA1 in the first LAN or LAN segment to receive a first modified session message MSM1 having a VPAI (VPAI=VP2) identifying a second virtual proxy VP2 outside the first LAN or LAN segment across the WAN 438. The first authentication agent AA1 is to transmit content CONT2 associated with the first modified session message MSM1 only to the first plurality of individual proxy modules 414.

With respect to authentication operations, the system 406 comprises a single cluster. The first plurality of individual proxy modules 414 may be included in a corresponding plurality of individual servers, or in a single server, or be distributed among some selected number of servers wherein some of the individual proxy modules 414 are included together in some servers, and others are included as single entities in single servers.

In some embodiments, the system 406 comprises a first virtual proxy VP1 within the first LAN or LAN segment to receive a local session message LSM1 from any of the first plurality of individual proxy modules 414. The first virtual proxy VP1 is used to transmit a second modified session message MSM2 to a second authentication agent AA2 in a second LAN or LAN segment across the WAN 438 after modifying the local session message LSM1 to provide the second modified session message MSM2 identifying the first virtual proxy VP1. Similarly, to transmit the first modified message MSM1 to the first authentication agent AA1, the system 406 may include a second virtual proxy VP2 in the second LAN or LAN segment. The modified session message MSM1 is sent to all authentication agents (including authentication agent AA1) that are not located in the LAN or LAN segments where the local message LSM2, upon which it is based, originated. Similarly, the modified session message MSM2 is sent to all authentication agents (including authentication agent AA2) that are not located in the LAN or LAN segments where the local message LSM1, upon which it is based, originated.

Thus, as described previously, the LPAI (e.g., LPAI=IPM2) in the local session message LSM1 having a specified protocol is to be replaced by a VPAI (e.g., VPAI=VP1) associated with the first virtual proxy VP1 to provide the second modified session message MSM2. After transmission to the authentication agents representing the various LAN segments in the cluster, the second authentication agent AA2 can be used to transmit content CONT1 associated with the second modified session message MSM2 only to a second plurality of individual proxy modules 416 in the second LAN or LAN segment.

Implementing the apparatus, systems, and methods described herein may thus provide a dramatic reduction in the number of replicated sessions across a WAN. The message traffic across the LAN may also be reduced, with a commensurate reduction in system communication latency.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:
1. An apparatus, comprising:
 a first virtual proxy implemented in a non-transitory machine accessible medium to process on at least one machine within a first local area network (LAN) accessible via a plurality of virtual proxies including the first virtual proxy; and an authentication agent to process within the first LAN and to communicate with a plurality of individual proxy modules within the first LAN, wherein the first virtual proxy is selected from the plurality of virtual proxies to represent each of the plurality of individual proxy modules as a single point of trust across a wide area network (WAN) to authentication agents outside the first LAN, wherein the first virtual proxy is to replace a local proxy authentication identification used for a local session message received from any one of the plurality of individual proxy modules with a unique identification assigned to the first virtual proxy, the unique identification to be transmitted to a second LAN outside the first LAN across the WAN and the unique identification to allow the first virtual proxy to be identified across the WAN, and wherein the authentication agent is to receive a modified session message originated within the second LAN across the WAN and to transmit content associated with the modified session message to the plurality of individual proxy modules.

2. The apparatus of claim 1, wherein the first virtual proxy is to modify the local session message according to a virtual proxy authentication identification associated with the first virtual proxy to provide a modified session message.

3. The apparatus of claim 1, wherein the apparatus comprises a server including the first virtual proxy and the authentication agent.

4. The apparatus of claim 1, further comprising:
a memory to store a configuration including protocols and ports associated with the plurality of individual proxy modules and their respective local proxy authentication identifications.

5. The apparatus of claim 1, wherein the authentication agent is to communicate with a selected one of the other virtual proxies in any selected location across the WAN.

6. The apparatus of claim 1, wherein the authentication agent is configured to receive the modified session message from a second virtual proxy serving as the single point of trust for the second LAN across the WAN, wherein the second virtual proxy is different from the first virtual proxy.

7. A system, comprising:
a first virtual proxy within a first local area network (LAN) accessible via a plurality of virtual proxies including the first virtual proxy, to receive a local session message from any one of a first plurality of individual proxy modules within the first LAN, the first virtual proxy selected from the plurality of virtual proxies to serve as a single point of trust for the first LAN across a wide area network (WAN); and
a first authentication agent implemented in a non-transitory machine accessible medium to process on at least one machine within the first LAN and to receive a first modified session message having a virtual proxy authentication identification from a second virtual proxy located in a second LAN outside the first LAN across the WAN, wherein the first virtual proxy is to replace a local proxy authentication identification used for the local session message with a unique identification assigned to the first virtual proxy, the unique identification to be transmitted to the second LAN across the WAN and the unique identification to allow the first virtual proxy to be identified across the WAN, and wherein the first authentication agent is to transmit content associated with the first modified session message to the first plurality of individual proxy modules.

8. The system of claim 7, wherein each of the first plurality of individual proxy modules are included in a corresponding different server.

9. The system of claim 7, wherein the first virtual proxy is configured to transmit a second modified session message to a second authentication agent in the second LAN across the WAN after modifying the local session message to provide the second modified session message identifying the first virtual proxy.

10. The system of claim 9, wherein the local proxy authentication identification in the local session message comprises a specified protocol.

11. The system of claim 9, further comprising:
the second authentication agent to transmit content associated with the second modified session message just to a second plurality of individual proxy modules in the second LAN.

12. The system of claim 7, wherein the first authentication agent is configured to transmit the content directly to the first plurality of individual proxy modules.

13. The system of claim 7, wherein the content is created at one of a second plurality of individual proxy modules located within the second LAN.

14. The system of claim 7, wherein the virtual proxy authentication identification is transmitted across the WAN separate from the session messages.

15. The system of claim 7, wherein the virtual proxy authentication identification is transmitted across the WAN based on a specified trust relationship between the first virtual proxy and the authentication agents.

16. A method, comprising:
receiving, at a first virtual proxy within a first local area network (LAN) accessible via a plurality of virtual proxies including the first virtual proxy, a local proxy authentication identification associated with one of a first plurality of individual proxy modules within the first LAN;
replacing, at the first virtual proxy, the local proxy authentication identification with a unique identification assigned to the first virtual proxy, the unique identification to be transmitted to a second LAN outside the first LAN across a wide area network (WAN) and the unique identification to allow the first virtual proxy to be identified across the WAN, the first virtual proxy selected from the plurality of virtual proxies to serve as single point of trust for the first LAN across the WAN for session messages from the first plurality of individual proxy modules; and
responsive to receiving a modified session message originated within the second LAN across the WAN, transmitting content associated with the modified session message to the first plurality of individual proxy modules.

17. The method of claim 16, further comprising:
transmitting the virtual proxy authentication identification across the WAN to an authentication agent in the second LAN, and to other authentication agents representing other LANs.

18. The method of claim 16, further comprising:
receiving, at an authentication agent in the second LAN, the virtual proxy authentication identification in a modified one of the session messages from the first virtual proxy across the WAN; and
transmitting content associated with the modified one of the session messages just to a second plurality of individual proxy modules in the second LAN.

19. The method of claim 16, comprising:
reading the local proxy authentication identification from a configuration database; and associating the local proxy authentication identification with one of the session messages.

20. The method of claim 19, comprising:
populating the configuration database with information regarding a trust relationship among the first virtual proxy, the first plurality of individual proxy modules, and an authentication agent in the second LAN.

21. A method, comprising:
receiving, at an authentication agent in a first local area network (LAN) accessible via a plurality of virtual proxies including a first virtual proxy selected from the plurality of virtual proxies to serve as a single point of trust for the first LAN across a wide area network (WAN), a virtual proxy authentication identification from a second virtual proxy serving as the single point of trust for a second LAN across the WAN, the virtual proxy authentication identification comprising a unique identification assigned to the second virtual proxy, the unique identification to allow the second virtual proxy to be identified across the WAN; and
transmitting content associated with a modified session message originated within the second LAN and the virtual proxy authentication identification just to a first plurality of individual proxy modules in the first LAN.

22. The method of claim 21, wherein the transmitting comprises transmitting the content directly from the authentication agent to the first plurality of individual proxy modules.

23. The method of claim 21, further comprising:
modifying, at the second virtual proxy, a local session message received from one of a second plurality of individual proxy modules in the second LAN using the virtual proxy authentication identification to provide the modified session message.

24. The method of claim 21, further comprising:
repeating the receiving to replicate sessions created in the second LAN and authenticated by the second virtual proxy.

25. The method of claim 21, further comprising:
assigning unique virtual proxies, including at least one of the first virtual proxy or the second virtual proxy, to connection endpoints of the WAN.

26. The method of claim 25, wherein the connection endpoints comprise transmission control protocol (TCP) endpoints, and combinations of Internet Protocol (IP) addresses and TCP ports for the connection endpoints are used to establish trust between peers.

27. The method of claim 25, wherein the connection endpoints comprise secure socket layer (SSL) endpoints, and at least one of server certificates and client certificates are used to establish trust between peers.

28. The method of claim 21, further comprising:
communicating information regarding a session associated with the modified session message from the second virtual proxy to the authentication agent; and
replicating the information within the first LAN using the first plurality of individual proxy modules trusted by the authentication agent.

29. An apparatus, comprising:
a first virtual proxy implemented in a non-transitory machine accessible medium to process on at least one machine within a first local area network (LAN); and
an authentication agent to process within the first LAN and to communicate with a plurality of individual proxy modules within the first LAN, wherein the first virtual proxy is to represent each of the plurality of individual proxy modules as a single point of trust across a wide area network (WAN) to authentication agents outside the first LAN, wherein the first virtual proxy is to replace a local proxy authentication identification used for a local session message received from any one of the plurality of individual proxy modules with a unique identification assigned to the first virtual proxy, the unique identification to be transmitted to a second LAN outside the first LAN across the WAN and the unique identification to allow the first virtual proxy to be identified across the WAN, and wherein the authentication agent is to receive a modified session message originated within the second LAN across the WAN, to transmit content associated with the modified session message to the plurality of individual proxy modules, and to refrain from transmitting the content associated with the modified session message to the first virtual proxy.

* * * * *